Nov. 26, 1946.  W. DENNIS  2,411,680
SEPARATION OF THE CONSTITUENTS OF GASEOUS MIXTURES
Filed March 7, 1944
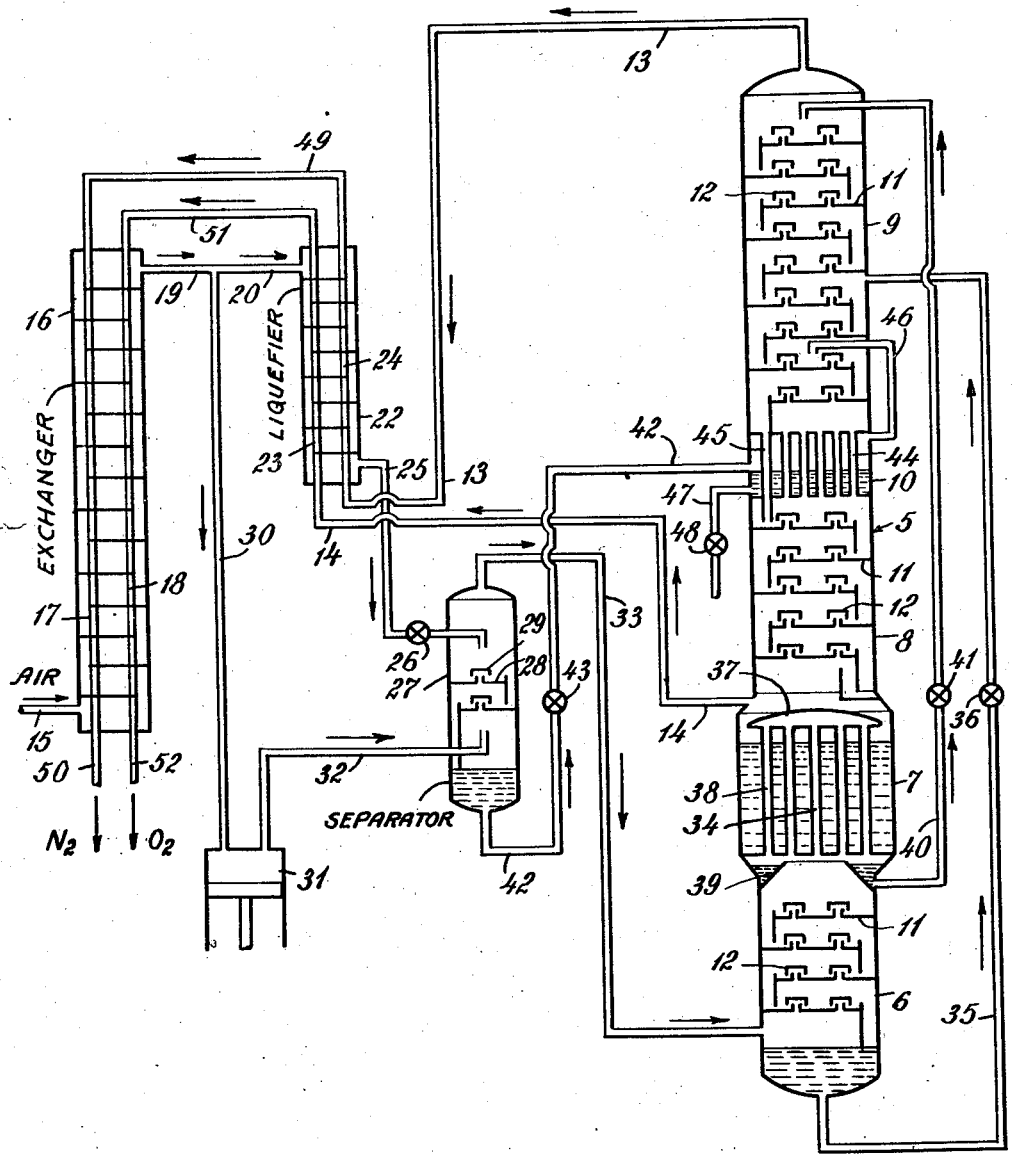
INVENTOR
Wolcott Dennis
BY
ATTORNEYS Patented Nov. 26, 1946

2,411,680

UNITED STATES PATENT OFFICE 2,411,680

SEPARATION OF THE CONSTITUENTS OF GASEOUS MIXTURES

Wolcott Dennis, Darien, Conn., assignor to Air Reduction Company, Incorporated, New York, N. Y., a corporation of New York Application March 7, 1944, Serial No. 525,385

8 Claims. (Cl. 62—175.5)

This invention relates to the separation of the constituents of gaseous mixtures by liquefaction and rectification and particularly to the recovery of oxygen and nitrogen from the atmosphere. Although described hereinafter in more detail with reference to the treatment of air, the method may be utilized in separating the constituents of other gaseous mixtures.

In the commercial recovery of oxygen and nitrogen from air, the problem of removing carbon dioxide, water, oil and hydrocarbons present therein introduces certain difficulties. Scrubbers may be utilized to treat the air before or after compression, but such devices are not completely effective, particularly in connection with oil and decomposition products thereof. Oil introduced by oil-lubricated compressors and hydrocarbons derived therefrom by decomposition are particularly troublesome. The accumulation of oil and other hydrocarbon compounds at points where oxygen or gases enriched in oxygen occur, is undesirable. Various procedures designed to prevent such accumulation have been suggested. These are generally complicated or introduce substantial losses in efficiency.

It is the object of the present invention to afford a simple and effective method whereby undesirable impurities in the gaseous mixture treated may be eliminated readily without interfering materially in the proper and efficient functioning of the desired separation and recovery of the constituents. Other objects and advantages of the invention will be apparent as it is better understood by reference to the following specification and the accompanying drawing, which diagrammatically illustrates an apparatus suitable for the practice of the invention. Details of the apparatus which are well known in the art have been omitted for the purpose of clarity.

I have discovered that the impurities present in air which is supplied to a system designed to separate and recover oxygen and nitrogen therefrom may be concentrated in a liquid fraction of the air treated and that the refrigerative effect of the liquid can be recovered effectively by transferring the liquid to an appropriate level of the rectification column and there evaporating it by indirect heat exchange with vapors in the column at a point such that little if any loss of rectification efficiency results. The vapors from the liquid can be introduced to the column in order to retain the valuable constituents thereof. By withdrawing a portion of the liquid in which the impurities are concentrated, the latter may be removed from the system. By this procedure, the possibility that impurities and particularly oil and hydrocarbons derived therefrom can be concentrated at a point where oxygen or vapors materially enriched in oxygen occur is eliminated. The products are free from such impurities. No substantial loss of the constituents or of refrigerative effect results from the procedure as described. A similar procedure can be utilized to prevent accumulation of impurities present in other gaseous mixtures which are to be separated for the purpose of recovering the constituents thereof.

In order to avoid material loss of rectification efficiency in the rectification column, the liquid fraction carrying impurities should be evaporated by heat exchange with vapors at the highest possible level in the column which will afford a reasonable temperature difference for operation. In a column separating high purity oxygen from air, a considerable number of trays is required in the lower portion of the low pressure rectifier to separate oxygen from argon. This separation is quite difficult compared with the separation of nitrogen from oxygen which is carried out mainly in the upper portion of the low pressure rectifier. An appropriate location for the evaporation of the impure liquid fraction by condensation of vapors in the column would be that point where the concentration of nitrogen in the vapors is low and just above that portion of the low pressure rectifier in which the main separation is between oxygen and argon. By choosing such a location sufficient temperature difference is made available without material interference with the difficult separation of oxygen and argon.

Referring to the drawing, 5 indicates a rectification column having a lower section 6, a condenser section 7, two rectifier sections 8 and 9 and an intermediate vaporizer section 10. The sections 6, 8 and 9 are provided with the usual trays 11 and bubble caps 12 to facilitate intimate contact of vapors and liquids flowing therethrough. At the top of the section 9, a pipe 13 permits the withdrawal of the effluent which in the case of air is principally nitrogen. The other product, for example oxygen, is withdrawn through a pipe 14 which is connected to the condenser section 7.

The gaseous mixture to be treated, for example air, after compression to a suitable pressure, for example 15–20 atmospheres absolute, drying in the usual equipment to remove substantially all of the moisture, and cooling, is introduced through a pipe 15 to an exchanger 16 and after circulating about tubes 17 and 18 therein, carrying cold products of the separation, the air is delivered to a pipe 19. A pipe 20 delivers the cooled air to a liquefier 22 wherein it circulates about tubes 23 and 24 carrying cold products of the separation. The air is liquefied and the liquid is delivered through a pipe 25 and pressure reducing valve 26 to a separator 27 having trays 28 and bubble caps 29.

The remainder of the air is delivered through a pipe 30 to an expansion engine 31 of the usual type wherein the air is expanded with external work, and thereby cooled. After expansion, the air is delivered through a pipe 32 to the separator 27. The air passes upwardly through the trays 28, of which any suitable number may be provided, in contact with the liquefied air flowing downwardly thereover. Impurities present in the liquid and the vapor phase air are accumulated in the liquid that collects in the bottom of the separator. The air freed from such impurities is delivered through a pipe 33 to the section 6 of the column. It passes upwardly through the trays 11 in contact with liquid produced as the air flows through tubes 34 of the condenser section 7 in heat exchange with liquid surrounding the tubes. As the result, a liquid accumulates in the bottom of the section 6 which is substantially enriched in oxygen, usually containing approximately 40% of that constituent. This liquid is delivered through a pipe 35 and valve 36 to an intermediate level of the section 9 of the column.

That portion of the air which is not liquefied in the tubes 34 continues to the head 37 and thence downwardly through the tubes 38. The liquid formed therefrom is gathered in a collector 39 from which it is withdrawn through a pipe 40 and valve 41 and delivered to the top of the section 9 of the column. This liquid is substantially pure nitrogen and affords the reflux liquid necessary to complete the separation of the constituents of the gaseous mixture by rectification.

The liquid from the separator 27 is withdrawn through a pipe 42 controlled by a valve 43 and delivered to the vaporizer section 10 of the column where it surrounds tubes 44 through which vapors rising through the column must pass. The vaporizer 10 may be disposed externally of the column and connected thereto so that vapors from the desired level will be delivered thereto for heat exchange with liquid supplied from the separator 27. The vapors are partially condensed by heat exchange with the liquid in the vaporizer section 10 and the liquid product flows downwardly onto the trays of the section 8 of the column, thus affording additional liquid enriched in oxygen to facilitate the rectification. Liquid from the section 9 of the column is delivered to the section 8 through a pipe 45. The impure liquid in the vaporizer section 10 is vaporized, except for the portion hereinafter mentioned, and the vapor is delivered by a pipe 46 to the section 9 of the column where it mingles with vapors rising through the section and with the liquid flowing downwardly therethrough. A portion of the liquid is withdrawn from time to time through a pipe 47 controlled by a valve 48. By such withdrawal the impurities which have accumulated in the liquid are eliminated from the system. It is necessary to withdraw only a relatively small amount of liquid in order to effect the primary purpose of the invention.

The effluent nitrogen withdrawn through the pipe 13 passes through the tubes 24 of the liquefier and thence through a pipe 49 to the tubes 17 of the exchanger. It may be withdrawn through a pipe 50 and discharged to the atmosphere or to any suitable receptacle for storage. The oxygen which is evaporated from the liquid in the condenser 7 and withdrawn through the pipe 14 passes through the tubes 23 of the liquefier and thence through a pipe 51 to the tubes 18 of the exchanger. It may be withdrawn through a pipe 52 and delivered to any suitable storage receptacle.

By the procedure as described, the impurities and particularly oil and hydrocarbon derivatives, are removed from the gaseous mixture which is to undergo liquefaction and accumulated in a liquid. Refrigeration losses are avoided by vaporizing this liquid at an appropriate level in the rectifier. The refrigeration is thus conserved and the vapors from the liquid are likewise retained and separated to recover the desired constituents.

Various changes may be made in the form and arrangement of the apparatus and in the details of the procedure without departing from the invention or sacrificing the advantages thereof.

I claim:

1. The method of separating the constituents of gaseous mixtures which comprises liquefying a portion of the compressed and cooled gaseous mixture, preliminarily scrubbing the remainder of the gaseous mixture with the liquid portion thereof to provide a vapor free from impurities and a liquid in which the impurities are concentrated, subjectng said vapor to liquefaction to provide a liquid substantially free from impurities and separate from the liquid previously formed during the preliminary scrubbing operation, subjecting said second liquid to rectification, bringing the liquid in which the impurities are concentrated into indirect heat exchange with vapors produced during the rectification to thereby liquefy a portion of such vapors, and adding the liquid thus produced to the rectification as reflux.

2. The method of separating the constituents of gaseous mixtures which comprises liquefying a portion of the compressed and cooled gaseous mixture, preliminarily scrubbing the remainder of the gaseous mixture with the liquid portion thereof to provide a vapor free from impurities and a liquid in which the impurities are concentrated, subjecting said vapor to liquefaction to provide a liquid substantially free from impurities and separate from the liquid previously formed during the preliminary scrubbing operation, subjecting said second liquid to rectification, passing the liquid in which the impurities are concentrated into an intermediate level of the rectification and there maintaining it in indirect heat exchange with vapors present to liquefy a portion of such vapors and provide reflux liquid for use in the rectification.

3. The method of separating the constituents of gaseous mixtures which comprises liquefying a portion of the compressed and cooled gaseous mixture, preliminarily scrubbing the remainder of the gaseous mixture with the liquid portion thereof to provide a vapor free from impurities and a liquid in which the impurities are concentrated, subjecting said vapor to liquefaction to provide a liquid substantially free from impurities and separate from the liquid previously formed during the preliminary scrubbing operation, subjecting said second liquid to rectification, subjecting vapors from an intermediate level of the rectification to backward return condensation by indirect heat exchange with the liquid in which the impurities are concentrated, to thereby liquefy a portion of such vapors, and adding the liquid thus formed to the rectification as reflux.

4. The method of separating the constituents of gaseous mixtures which comprises liquefying a portion of the compressed and cooled gaseous mixture, preliminarily scrubbing the remainder of the gaseous mixture with the liquid portion thereof to provide a vapor free from impurities and a liquid in which the impurities are concentrated, subjecting said vapor to liquefaction to provide a liquid substantially free from impurities and separate from the liquid previously formed during the preliminary scrubbing operation, subjecting said second liquid to rectification, bringing the liquid in which the impurities are concentrated into indirect heat exchange with vapors produced during the rectification to thereby liquefy a portion of such vapors, adding the liquid thus produced to the rectification as reflux, and adding vapors produced by resultant vaporization of a part of the liquid in which the impurities are concentrated to the rectification.

5. The method of separating the constituents of gaseous mixtures which comprises liquefying a portion of the compressed and cooled gaseous mixture, preliminarily scrubbing the remainder of the gaseous mixture with the liquid portion thereof to provide a vapor free from impurities and a liquid in which the impurities are concentrated, subjecting said vapor to liquefaction to provide a liquid substantially free from impurities and separate from the liquid previously formed during the preliminary scrubbing operation, subjecting said second liquid to rectification, passing the liquid in which the impurities are concentrated into an intermediate level of the rectification and there maintaining it in indirect heat exchange with vapors present to liquefy a portion of such vapors, adding the liquid thus produced to the rectification as reflux, and adding vapors produced by resultant vaporization of a part of the liquid in which the impurities are concentrated to the rectification.

6. The method of separating the constituents of gaseous mixtures which comprises liquefying a portion of the compressed and cooled gaseous mixture, preliminarily scrubbing the remainder of the gaseous mixture with the liquid portion thereof to provide a vapor free from impurities and a liquid in which the impurities are concentrated, subjecting said vapor to liquefaction to provide a liquid substantially free from impurities and separate from the liquid previously formed during the preliminary scrubbing operation, subjecting said second liquid to rectification, subjecting vapors from an intermediate level of the rectification to backward return condensation by indirect heat exchange with the liquid in which the impurities are concentrated, to thereby liquefy a portion of such vapors, adding the liquid thus produced to the rectification as reflux, and adding vapors produced by resultant vaporization of a part of the liquid in which the impurities are concentrated to the rectification.

7. The method of separating the constituents of gaseous mixtures which comprises liquefying a portion of the compressed and cooled gaseous mixture, preliminarily scrubbing the remainder of the gaseous mixture with the liquid portion thereof to provide a vapor free from impurities and a liquid in which the impurities are concentrated, subjecting said vapor to liquefaction to provide a liquid substantially free from impurities and separate from the liquid previously formed from the preliminary scrubbing operation, subjecting said second liquid to rectification, subjecting vapors from an intermediate level of the rectification to indirect heat exchange with the liquid in which the impurities are concentrated, to thereby liquefy a portion of such vapors, adding the liquid thus formed to the rectification as reflux, adding vapors produced by resultant vaporization of a part of the liquid in which the impurities are concentrated to the rectification, and discarding the balance of the liquid containing the impurities.

8. The method of separating the constituents of gaseous mixtures by liquefaction and rectification which comprises cooling the compressed gaseous mixture, liquefying a portion thereof by heat exchange with cold products of the separation, expanding the remainder of the gaseous mixture to a lower pressure, preliminarily scrubbing the expanded portion with the liquified portion to provide a vapor free of impurities and a liquid in which the impurities are concentrated, subjecting said vapor to liquefaction in two fractions separate from the liquor previously formed during the preliminary scrubbing operation and respectively enriched in the higher and lower boiling constituents of the gaseous mixture and to rectification, subjecting vapors from an intermediate level of the rectification to indirect heat exchange with the liquid in which the impurities are concentrated to thereby liquefy a portion of such vapors and to vaporize a portion of the liquid containing the impurities, adding the liquid thus formed to the rectification as reflux, adding the vapor produced by the partial vaporization of the liquid containing the impurities to the rectification, and withdrawing the balance of the liquid containing impurities.

WOLCOTT DENNIS.